Aug. 29, 1961 E. O. LARSON 2,997,905
HEATED CUTTING DIE MEANS
Filed Oct. 15, 1956

Inventor
Ernest O. Larson
by Roberts Cushman & Grover,
Att'ys.

United States Patent Office 2,997,905
Patented Aug. 29, 1961

2,997,905
HEATED CUTTING DIE MEANS
Ernest O. Larson, Quincy, Mass., assignor to Boston Cutting Die Company, Boston, Mass., a corporation of Massachusetts
Filed Oct. 15, 1956, Ser. No. 615,867
3 Claims. (Cl. 83—171)

It has been found that stamping operations for which conventional cutting dies are customarily used, present problems that cannot be satisfactorily overcome with such dies, if the blanks to be shaped comprise certain thermoplastic synthetic materials. This is especially serious if the blanks have to be cut on contour lines which are located within three-dimensionally curved surfaces.

It is one of the principal objects of the present invention to provide cutting die equipment which permits clean cuts through thermoplastic material on variously ascending and descending and curved lines without leaving any rugged or sharp edges, to provide such equipment which is inexpensive and simple in manufacture and operation, which is safe for operation even by unskilled personnel, and generally to advance the cutting die technology.

Briefly stated by way of a summary indicating its nature and substance, for accomplishing the above objects, the invention introduces, in one of its principal aspects, apparatus which comprises cutting die means such as a steel strip having a cutting edge, combined with metallic tube means that is heat conductively secured to the cutting die means in close proximity to the edge thereof so far as permitted by the nature of the material to be cut, and further combined with means for driving a heated fluid through the tube means.

It has heretofore been proposed to heat, such as by way of gas flames, dies for the purpose of embossing materials such as leather and it has also been proposed to heat cutting dies by electrical resistance means, but it was found that these expedients are not particularly useful for the above indicated objects where a three dimensionally curved cutting edge must be continuously maintained at a uniform and easily controlled temperature with rugged equipment which can be easily fabricated to suit sometimes frequently changing requirements as to shape and operating temperature. This is accomplished with very satisfactory results by means of arrangements of the above characterized general nature.

In another, practically very important aspect of the invention, the cutting die means has an edge which extends within a three-dimensionally curved surface, and the metallic tube means are heat conductively secured to the die essentially parallel to the edge, in a similar three-dimensional pattern.

In a specific practical embodiment of the invention, a press incorporating the same comprises cutting die means having an edge that extends within a three-dimensionally curved surface and cooperates with a counterdie means such as a female die, the two die means being movable relatively to each other, the counterdie means being usually fixed and the cutting die means moving up and down vertically thereabove, the cutting die means having the above characterized heating tube arrangement applied in close contact therewith and fastened thereto by a body which contains metal and is therefore heat conducting, and the press further comprising means for heating a fluid such as a thermostatically controlled electric immersion heating device within an oil tank, and means for driving the fluid through the heating tube means such as by way of flexible tubing that leads from the tank or reservoir to the movable cutting die and back into the tank, such as a pump arranged in the closed oil circuit, the fluid being preferentially oil having suitable viscosity and thermal characteristics. In many instances especially where easy and inexpensive assembly is desirable, a metal containing cement or so-called liquid solder, was found to be quite satisfactory for use as the heat conductive material for fastening the tubing to the die.

These and other objects and aspects of novelty of the invention will appear from the following description of a typical embodiment thereof illustrating its characteristics. This description refers to a drawing in which.

Figure 1:
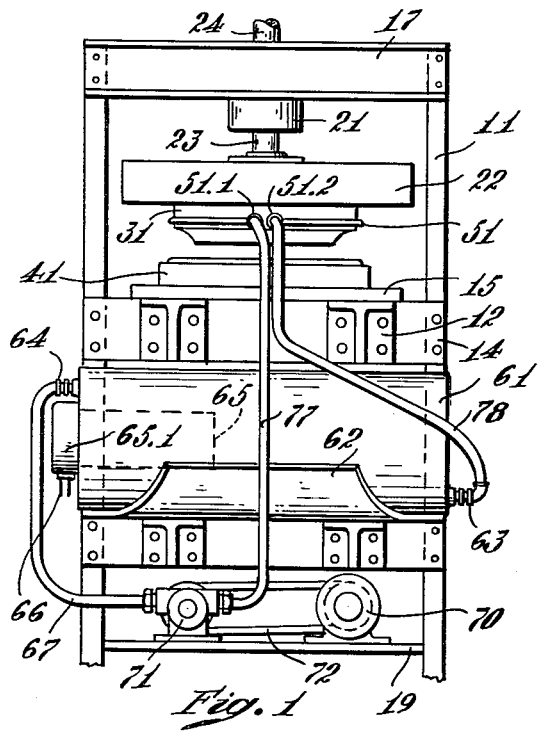
FIG. 1 is the front elevation of a die press which incorporates the invention.
Figure 2:
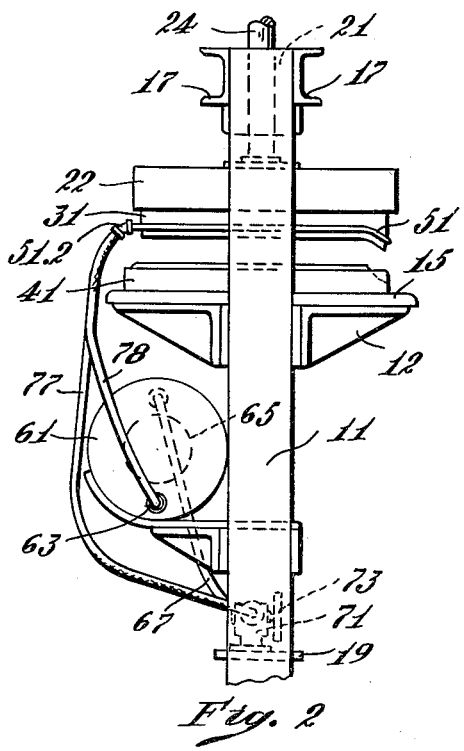
FIG. 2 is a side elevation corresponding to the front elevation according to FIG. 1.

In FIGS. 1 and 2, numeral 11 designates a frame of conventional design, for example fabricated from structural steel sections and including a bracket 12 whereto is fastened a bedplate 15.

A bridge structure 17 carries the die operating unit 21, the upper die carrier 22 depending therefrom on a pressure rod 23. The unit 21 may include conventional hydraulic apparatus for lifting and pressurably lowering the die support 22, but it can be merely a guide with the actual press mechanism attached thereto at 24.

Fastened to the support 22 is the upper die 31, herein also referred to as cutting or heated die, and fastened to the bedplate 15 is the lower or counterdie 41.

Figure 3:
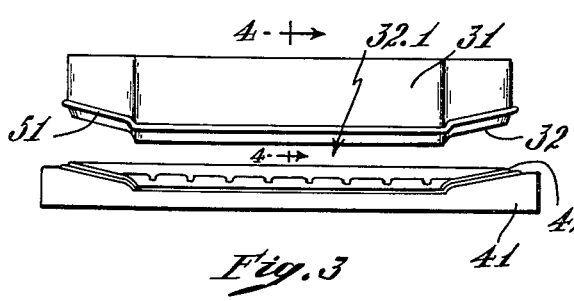
FIG. 3 is an enlarged front elevation of the upper and lower die members shown in FIGS. 1 and 2.
Figure 4:
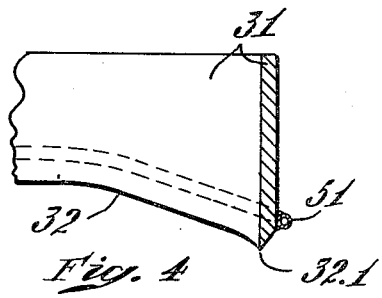
FIG. 4 is a fragmentary section through the upper die on line 4—4 of FIG. 3.

As shown in FIGS. 3 and 4, the upper die 31 has an edge 32 which is located within a three-dimensionally curved surface which can for example be defined by the contour configuration of the blank to be cut. Good examples for such three-dimensional contours are drainboards for sinks which have a depending drainage side to which corresponds the lowered and gradually curved die edge portion indicated at 32.1. The lower or counterdie 41 has a corresponding receiving or female recess 42 corresponding to the edge 32 of the upper die 31, and this recess follows the three-dimensional curvature of the edge 32. It will be understood that this recess is not necessary in all cases and that an unrecessed lower die can sometimes be used. On the other hand the heating arrangement now to be described can be used also for purposes of a two-dimensional cutting edge and a corresponding either flat or recessed receiving portion of the lower die.

Figure 5:
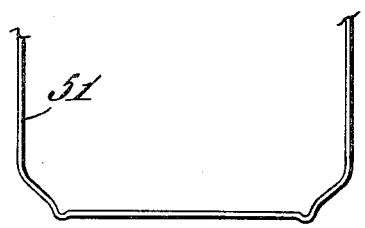
FIG. 5 shows the front portion of the tubing as also shown in FIGS. 3 and 4, by itself, prior to fastening it to its die member.

The tubing 51 is heat conductively secured to the upper or cutting die, in close proximity to its edge 32 and parallel thereto. This tubing can be made of any suitable heat-conductive material such as copper, brass or steel. Conventional 5/16" copper tubing was found to be suitable for most purposes. Good heat conductivity between the tubing and the die is obtained by fastening the tubing to the die by means of a continuous metallic body which completely fills the space between the die and the sides of the tubing. This can be accomplished by brazing, soldering or welding, depending on the material of the tubing. Cementing by means of so-called liquid solder, for example a hard drying paste containing about 20% steel and commercially available under the trade designation "Devcon," is also quite suitable. As shown in FIG. 5, the tubing follows closely the contour of the cutting edge which in the embodiment shown is intended for trimming and shaping a drainboard made from a thermoplastic polymer of a comparatively high softening point.

An oil tank 61 is suitably supported such as on a bracket 62 of the frame 11 and has oil intake and outlet nipples 63 and 64. An immersion heater unit 65 is arranged within the oil tank and has a conventional current supply arrangement indicated by the terminals 66 of FIG. 1. A thermostatically actuated temperature control device of conventional design is incorporated in the heater unit 65 and can be arranged at the outer end of the latter as indicated at 65.1 of FIGS. 1 and 2. It will be understood that, by means of this heater 65, the oil within tank 61 can be maintained at a nearly constant temperature. A suitable pipe line 67 connects the outlet 64 to an oil pump 71 of conventional design that is for example driven from the motor 70 by means of belt 72 and pulley 73. Flexible tubings 77, 78 connect the discharge end of the pump, and the inlet 63 of the oil tank, to respective connectors 51.1, 51.2 of the die tubing 51. It will be evident that oil heated in the tank 61 by the heater 65 can be circulated by means of the pump 71 and the various tubing components, and that a suitable capacity of the oil storage and heating tank, depending on the length of the die tubing 51 and the temperature gradients thereon, will provide an essentially uniform operating temperature of the die.

The operation of the above described apparatus is as follows.

The oil is brought to the required temperature, say between 300° and 550° F. depending on the blank material, the oil pump motor 70 and the pump 71 are started and the oil is circulated through the upper die tubing 51 until the die proper 31 has reached the required temperature. If desired, temperature detecting elements and in connection therewith automatic temperature regulating apparatus for the heater 65 can be installed according to conventional principles.

With the dies 31 and 41 separated, the blank is inserted and the upper die 31 lowered in a cycle that depends on the material of the blank and includes a preheating period and a cutting period. In the above mentioned practical embodiment, a cutting cycle lasts about 7 to 10 seconds. The die is first lowered until it contacts the blank, is kept in that position for about 5 seconds, whereupon the cut proper is performed, taking about 2 seconds.

The heated edge not only promotes easy cutting of the plastic material but also avoids any rugged or sharp edges, to the contrary providing smoothly rounded edges which give the finish blank a pleasing appearance and well finished contour and surface.

In addition to the above advantages it was found that the cutting with a heated die prevents discoloration of certain pigmented thermoplastic material at the cut. It is not definitely known why a stamping operation with heated dies should avoid the discoloration of pigmented polymers; most likely a melting and slow recrystallization cycle does not affect the pigment or dye as unfavorable as an abrupt disruption of the polymer structure. At any rate, this favorable effect is definitely repeatable, and so far it can be ascertained only in the above described manner.

It is not absolutely necessary, although in most cases preferable, to attach the heating tube to the cutting die as near its edge as possible. If necessary, the heating tube can be applied to the receiving or female die, or to both dies. In the latter instance, separate oil supply systems for the respective dies can be supplied and kept at different temperatures if desirable, for purposes of the above combined effect of providing a clean three-dimensional cut while avoiding unfavorable chemical or physical changes of the material of the blank.

I claim:

1. A stamping device comprising: a thin metallic cutting blade having a cutting edge; a metallic readily deformable tube heat conductively joined by an essentially metallic and continuous bond to a side of said blade in close proximity to said cutting edge and substantially throughout the length thereof; and means for connecting a source of heating fluid to said tube for passage substantially throughout the length thereof; whereby the blade can be uniformly heated by a uniformly heated fluid circulating in uniform proximity to the cutting edge.

2. A stamping device comprising: a thin metallic cutting die having a beveled end forming a cutting edge aligned with one side of the die; a metallic readily deformable tube heat conductively joined by an essentially metallic and continuous bond to the other side of said die in close proximity to the obtuse angle of said bevel of said end and substantially throughout the length therof; and means for connecting a source of heating fluid to said tube for passage substantially throughout the length thereof; whereby the die can be uniformly heated by a uniformly heated fluid circulating in uniform proximity to the cutting edge.

3. Stamping device according to claim 1 wherein said cutting blade and said edge extend in a three-dimensional curve and said tube extends three dimensionally in close proximity to said edge.

References Cited in the file of this patent

UNITED STATES PATENTS

| | | |
|---|---|---|
| 337,129 | Caldwell et al. | Mar. 2, 1886 |
| 490,824 | Hille | Jan. 31, 1893 |
| 904,569 | Stein | Nov. 24, 1908 |
| 1,449,445 | Rand | Mar. 27, 1923 |
| 1,637,715 | Small | Aug. 2, 1927 |
| 2,420,400 | Pfeil | May 13, 1947 |

FOREIGN PATENTS

| | | |
|---|---|---|
| 91,622 | Germany | May 3, 1897 |